United States Patent [19]

Schotten

[11] Patent Number: 4,552,660

[45] Date of Patent: Nov. 12, 1985

[54] PLATE FILTER HAVING A MOVABLE FILTER CLOTH

[75] Inventor: Alfons Schotten, Düren, Fed. Rep. of Germany

[73] Assignee: Eberhard Hoesch & Söhne GmbH & Co., Düren, Fed. Rep. of Germany

[21] Appl. No.: 562,286

[22] Filed: Dec. 16, 1983

[30] Foreign Application Priority Data

Dec. 17, 1982 [DE] Fed. Rep. of Germany ....... 3246771

[51] Int. Cl.⁴ .............................................. B01D 25/12
[52] U.S. Cl. .................................... 210/225; 210/226; 210/227
[58] Field of Search ................ 100/198; 210/224, 225, 210/226, 227, 228, 229, 230, 231, 400

[56] References Cited

U.S. PATENT DOCUMENTS 3,647,082 3/1972 Ishigaki ................................ 210/225
4,289,622 9/1981 Schotten .............................. 210/225

FOREIGN PATENT DOCUMENTS 2012400 1/1973 Fed. Rep. of Germany .

*Primary Examiner*—Richard V. Fisher
*Assistant Examiner*—W. Gary Jones

*Attorney, Agent, or Firm*—Spencer & Frank

[57] ABSTRACT

A plate filter comprises a plurality of shiftable filter plates and first and second deflecting rolls carried on opposite sides of each filter plate. The axes of consecutive first deflecting rolls lie alternatingly in a first plane and in a second plane spaced from one another. A filter cloth is guided in a zigzag course between consecutive filter plates by the first and second deflecting rolls. A first sprocket is affixed to each first deflecting roll and a second sprocket is mounted on each first deflecting roll for free idling rotation. First and second spaced, elongated, oppositely driven chains are respectively trained in a zigzag course in an alternating sequence about first and second sprockets of first deflecting rolls belonging to consecutive filter plates. The first and second chains are in meshing relationship with the first and second sprockets about which the chains are consecutively trained. The diameter of the first and second sprockets and the distance between the first and second planes are dimensioned for varying the magnitude of a loop angle represented by an arc along which the first and second chains are in engagement with respective first and second sprockets to compensate for length variations of the first and second chains upon shifting motion of the filter plates relative to one another.

2 Claims, 4 Drawing Figures

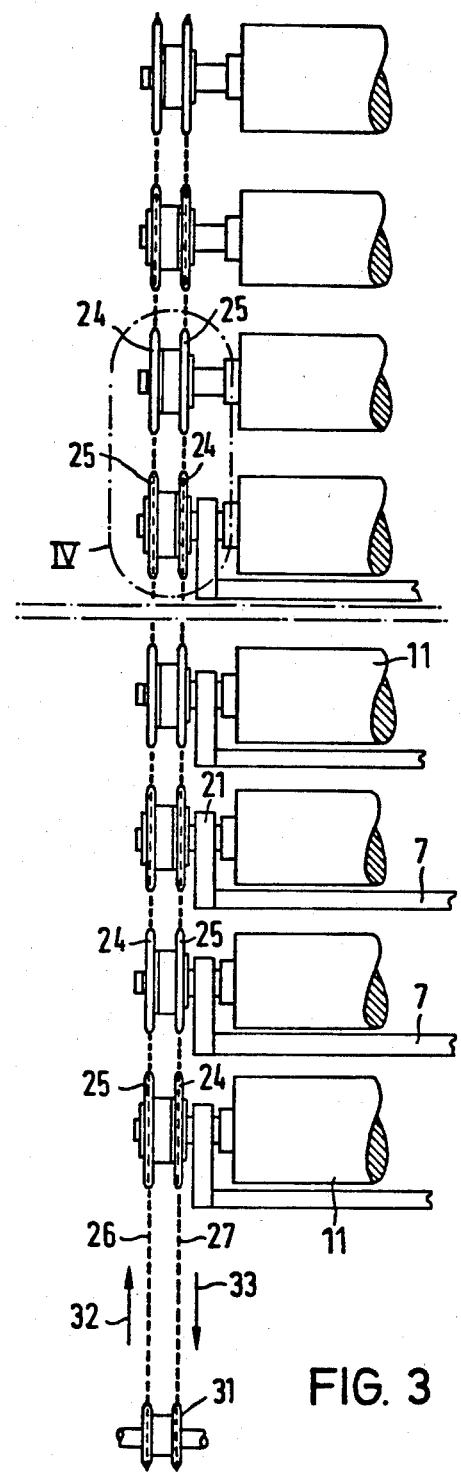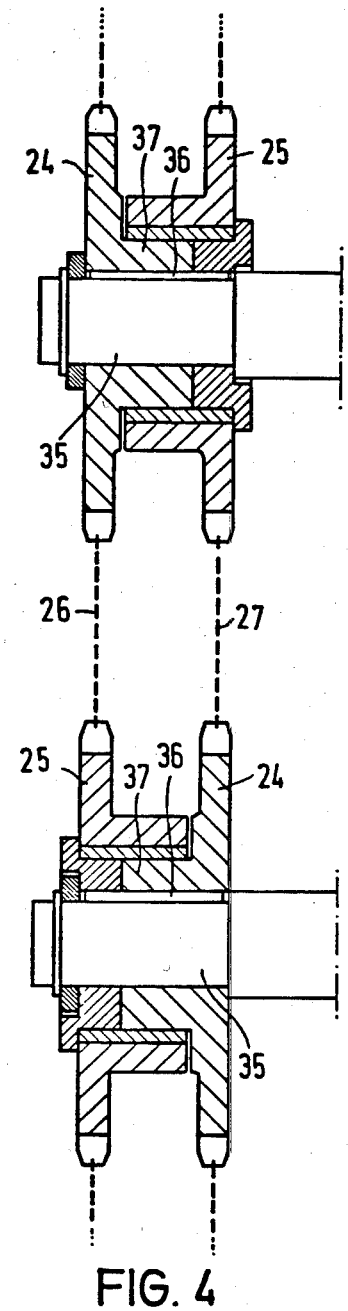
FIG. 3
FIG. 4

PLATE FILTER HAVING A MOVABLE FILTER CLOTH

BACKGROUND OF THE INVENTION

This invention relates to a plate filter having a plurality of shiftable filter elements comprising filter plates and frames arranged in an alternating sequence on a filter stand. The plate filter includes a filter element closing device which presses the filter elements together to form a compressed filter plate stack. At two opposite edges of some of the filter elements deflecting rolls are provided which support an endless filter cloth passing in a zigzag fashion between subsequent filter elements. At least some of the deflecting rolls are driven rolls. The plate filter further has a filter cloth driving mechanism which moves the filter cloth through the filter plate stack in the open (separated) state of the latter. At least some of the deflecting rolls (filter cloth support rolls) are, at one side of the filter plate stack, at least at one roll end, provided with a sprocket affixed thereto which meshes with a flexible, form-locking and endless driving means interconnecting several sprockets and being driven by a drive motor.

A plate filter of the above-outlined type including vertically oriented filter plates is disclosed in German Auslegeschrift (application published after examination) No. 2,012,400. It is a disadvantage of the known structure that upon closing the filter plate stack, the driving chain or driving belt length which is normally meshing with the sprockets from below, drops loose therefrom and hangs in a slack manner. In addition, for driving the filter cloth supporting (deflecting) rolls, two intersecting chains have to be positioned side-by-side so that in the closed state of the plate filter, side-by-side arranged, offset, slack chain lengths are present. The respective underlying return flight of the two chains is supported on end rollers on the stationary end plate as well as on the displaceable head plate of the plate filter so that upon closing of the plate filter the two return flights also hang loosely along their entire length.

During the closed state of the filter plate stack, almost during the entire opening process and almost during the entire closing process, neither the respective driving flight nor the respective return flight of the driving chains are guided; rather, there are formed side-by-side situated, freely suspended chain loops. Since particularly after a longer service period the roller chains or side bar chains may also move in a direction transversely to the pivotal plane of the chain links, small jars which cannot be safely avoided during the displacements, are sufficient to cause entanglement of the two loosely hanging chain flights. Such an occurrence may lead to operational disturbances and damages. It is a further disadvantage of the above-outlined known construction that it can be used only in plate filters having vertically oriented filter plates.

U.S. Pat. No. 4,289,622 discloses a filter cloth transporting mechanism in which the roller chain serving as the drive means is guided in such a manner by means of a combination of a sprocket and a deflecting roller in each filter element that the roller chain remains connected—independently from the open or closed state of the filter plate stack—the sprockets and the deflecting rolls even during the opening and closing motion of the filter elements. It is, however, a disadvantage of this structure that the entire driving output for the filter cloth transport has to be channelled through one roller chain, or more often, through two roller chains so that the roller chains have to be of sturdy construction. Further, this arrangement cannot be used in multiple drives for large filter units.

SUMMARY OF THE INVENTION

It is an object of the invention to provide an improved and simplified filter cloth transport mechanism, constituting a further development of the prior art structure disclosed in the last-noted United States patent.

This object and others to become apparent as the specification progresses, are accomplished by the invention, according to which, briefly stated, the plate filter comprises a plurality of shiftable filter plates and first and second deflecting rolls carried on opposite sides of each filter plate. The axes of consecutive first deflecting rolls lie alternatingly in a first plane and in a second plane spaced from one another. A filter cloth is guided in a zigzag course between consecutive filter plates by the first and second deflecting rolls. A first sprocket is affixed to each first deflecting roll and a second sprocket is mounted on each first deflecting roll for free idling rotation. First and second spaced, elongated, oppositely driven chains are respectively trained in a zigzag course in an alternating sequence about first and second sprockets of first deflecting rolls belonging to consecutive filter plates. The first and second chains are in meshing relationship with the first and second sprockets about which the chains are consecutively trained. The diameter of the first and second sprockets and the distance between the first and second planes are dimensioned for varying the magnitude of a loop angle represented by an arc along which the first and second chains are in engagement with respective first and second sprockets to compensate for length variations of the first and second chains upon shifting motion of the filter plates relative to one another.

The advantage of the invention resides particularly in that by means of the combination of a sprocket affixed to the deflecting roll with an axially aligned idling sprocket, a significant structural simplification is achieved. Further, each of the two parallel-running drive means, preferably roller chains, are driven by their own drive motor to thus achieve a better distribution of tension for the filter cloth. It is of particular advantage to provide that the drive motor for one drive means is situated at one end of the filter plate stack whereas the drive motor for the other, parallel drive means is arranged at the other end of the filter plate stack.

BRIEF DESCRIPTION OF THE DRAWINGS

FIG. 3 is a top plan view of one part of FIG. 2.

FIG. 4 is a sectional top plan view of the detail encircled at IV in FIG. 3.

DESCRIPTION OF THE PREFERRED EMBODIMENT

Figure 1:
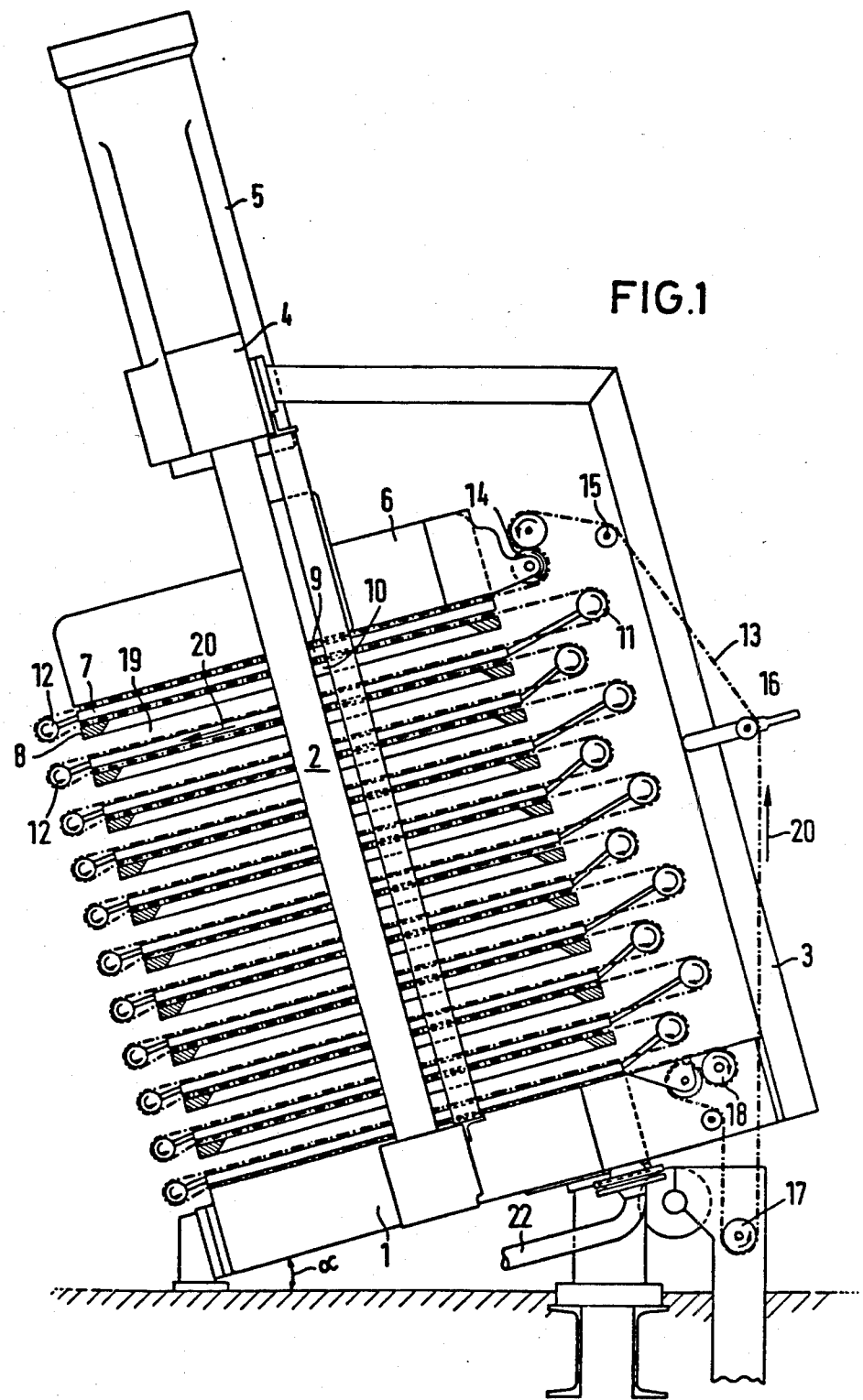
FIG. 1 is a schematic, partially sectional side elevational view of a preferred embodiment of the invention.

Turning now to FIG. 1, the filter press shown therein has a press stand comprising a fixed base plate 1 which is positioned at an inclination of $\alpha = 15°$ with respect to the horizontal. To the two opposite sloping sides of the base plate 1 there are fixedly secured guide carrier beams 2 and to the elevated side of the base plate 1 there is fixedly secured a filter stand beam 3. The three beams 2 and 3 are, at the upper end of the press stand, combined into a common transverse yoke 4 on which there is mounted a hydraulic closing cylinder 5. The piston rod (not visible in FIG. 1) of the closing cylinder 5 is coupled in a conventional manner with a head plate 6 displaceable parallel to the length of the plate filter.

Between the base plate 1 and the head plate 6 there are arranged a series of filter elements which form a filter plate stack. The filter elements comprise a plurality of filter plates 7 and a plurality of frames 8 arranged in an alternating sequence. The filter elements are supported on the two parallel guide carriers 2 by lateral guide attachments 9 formed on the filter elements as sliding blocks. FIG. 1 shows the filter plate stack in an open state in which the filter elements 7, 8 are separated (spaced) from one another. For the sake of clarity each frame 8 is shown in section.

On opposite two sides of each filter plate 7 there are mounted filter cloth deflecting rolls 11 and 12, respectively. The rolls 11 which are, because of the 15° inclination of the filter press, in the "high" position, have a larger diameter than the rolls 12 which are in the "low" position. A filter cloth 13 is guided by the rolls 11 and 12 in a zigzag fashion through the plate filter such that the filter cloth 13 in each instance moves past immediately at the upper side and the lower side of each filter plate 7 and passes between a filter plate 7 and a frame 8.

The filter cloth 13 is, on the upper side of the filter plate stack (as determined by the inclined position of the plate filter) guided through a driving station 14, guide rolls 15 and a regulating device 16 as well as a tensioning device 17. From the tensioning device 17 the filter cloth 13 is passed through a driving station 18 mounted in the base plate 1. Thereafter, the filter cloth runs through the filter plate stack in a zigzag manner as described above.

The filter plates 7 and the frames 8 are connected with one another in a known manner by means of a suspension device comprising, for example, a side bar chain which is so designed that in the open state of the plate filter, the space between a filter plate 7 and an underlying frame 8 is just large enough for allowing the filter cloth 13 to be pulled through, whereas the distance between a frame 8 and an underlying subsequent filter plate 7 is greater than the frame thickness so that the filter cake 19 whose height is determined by the thickness of the frame, may, as the filter cloth 13 is moved in the direction of the arrow 20 between the frame 8 and the underlying filter plate 7, move freely outwardly in the downward direction (as determined by the inclination of the filter press) and may be ejected onto a conveyor (not shown).

Figure 2:
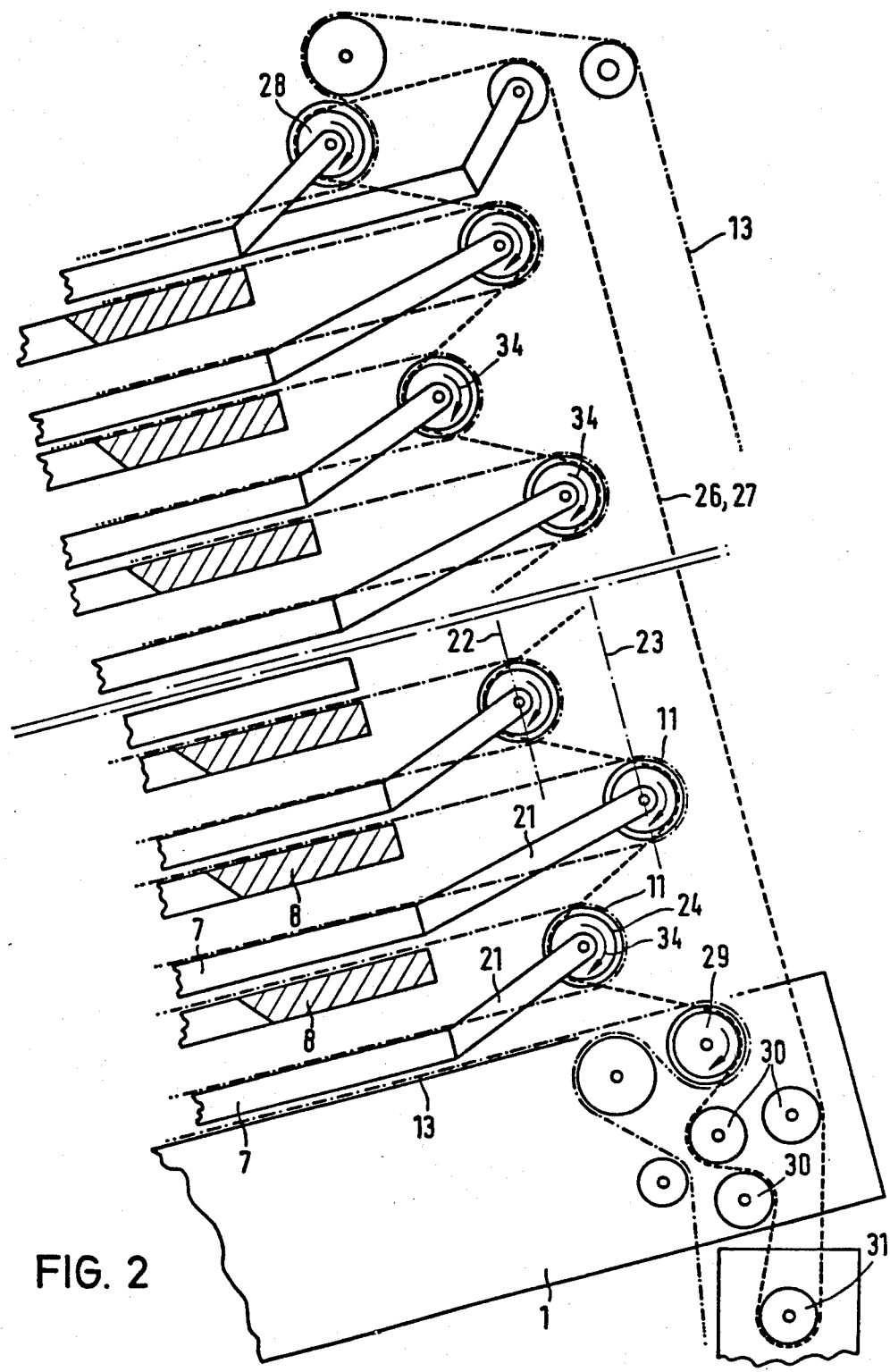
FIG. 2 is an enlarged detail of FIG. 1.

The filter cloth 13 is driven as shown in FIGS. 2 and 3. As seen in FIG. 2, the deflecting rolls 11 are each supported on a filter plate 7 by means of respective support arms 21. This arrangement is so designed that the axes of the consecutive deflecting rolls 11 are lying alternatingly in two parallel-oriented planes 22 and 23. To each deflecting roll 11 there is fixedly attached a sprocket 24 and, coaxially therewith, there is mounted for free, idling rotation a further sprocket 25. The distance between the two planes 22 and 23 is greater than the diameter of the sprocket 24 or 25, so that when the filter elements are pushed together to assume the closed position, the sprockets whose axis lies in the plane 22 may move past the sprockets whose axis lies in the plane 23.

Reverting in particular to FIG. 3, on the consecutive deflecting rolls 11 the sprockets 24 which are fixedly attached to the respective deflecting rolls and the associated idling sprockets 25 are so arranged that as viewed parallel to the length of the plate filter press, each fixed sprocket 24 is followed by an idling sprocket 25. As seen in FIGS. 2 and 3, there are thus provided two side-by-side running roller chains 26 and 27 which are, codirectionally and in a zigzag course, trained about the sprockets of the consecutive deflecting rolls 11. The roller chains 26 and 27 are, in the end zone of the filter plate stack, in a meshing relationship with a driving cylinder 28 and 29 rotated in the same sense by a drive motor. The filter cloth 13 is also trained about the cylinders 28 and 29. The idling (return) flights of the two side-by-side arranged roller chains 26 and 27 are guided over a deflecting pinion 30 and a weight-biased or spring-biased tensioning pinion 31. Since the roller chain 26 is engaged on an opposite chain side by the driving sprockets (associated with the driving cylinders 28 and 29) as compared to the roller chain 27, the roller chains 26 and 27 are driven in opposite directions despite the co-directional rotation of the driving cylinders 28 and 29. Thus, the outer chain 26 moves in the direction of the arrow 32 whereas the inner chain 27 advances in the direction of the arrow 33. By virtue of the above-described arrangement of idling and fixed sprockets associated with each deflecting roll 11, there is thus achieved for each deflecting roll 11 a rotation in the same sense in the direction of the arrow 34 and there is thus achieved a unidirectional pull-through of the filter cloth 13.

The distance between the two planes 22 and 23 as well as the diameters of the sprockets 24 and 25 are coordinated with one another in such a manner that as the filter elements are pushed together to assume a closed position of the filter plate stack, the sprockets whose axis lies in the plane 22 move past the sprockets whose axis lies in the plane 23. By virtue of an appropriate dimensioning of the diameters and the distances, the looping angle of the chains about the sprockets (that is, the angle of the arc along which chain and sprocket are in engagement with one another) increases from 136° (as illustrated) to more than 180°. This means that the lengths of the chains 26 and 27 between any adjoining sprockets are, when the filter elements are pushed together, "wound" on the sprockets while upon opening of the filter plate stack the chain lengths are "unwound" from the sprockets. The "windable" length of the chains corresponds practically to the width between two filter plates determined by spacer elements so that no torque will be applied to the deflecting rolls either during the opening process or during the closing process. This circumstance is of importance because during opening of the filter plate stack, beginning with the head plate 6 situated on the top of the plate filter, the individual filter elements connected to one another by spacer elements are separated sequentially from one another in an accordionlike manner. Since, during this procedure, one part of the filter cloth length is still in a clamped-in state while the other part of the filter cloth length is already freely exposed, the drivable deflecting rolls must not be submitted to any forces (torques) since this would lead to excessive local stretching of the filter cloth. Such an occurrence is prevented by the above-described "winding" and "unwinding" of the working flight of the chains 26 and 27. It is to be understood that instead of roller chains other drive means such as toothed belts may be used.

The length equalization of the idle (return) flight of the chains 26 and 27 during the opening and closing of the filter plate stack is effected by means of the spring-loaded or weight-loaded tensioning pinion 31.

While FIG. 2 illustrates a filter cloth transport for a plate filter press with filter plates arranged one above the other, it may be seen from FIG. 2 that the filter cloth transport according to the invention may also be used in plate filter presses where the filter elements are situated side-by-side, that is, they are arranged in a vertical orientation on the plate filter stand and are designed for horizontal shifting motion. Whether the invention is used in plate filters with vertically oriented filter plates or plate filters with horizontally or, as described, with obliquely arranged filter plates, expediently a fixed and an idling sprocket are arranged at both ends of each deflecting roll 11 so that each deflecting roll 11 is driven by one chain at each end.

Turning now to FIG. 4 which is the enlarged sectional detail IV of FIG. 3, there is shown the support of the sprockets 24 and 25 for two adjoining deflecting rolls 11. Each sprocket 24 mounted directly on a stub shaft 35 of the respective deflecting roll 11 is rotating in unison with the respective deflecting roll 11 by virtue of its fixed connection (for example, by means of a spline 36) with the stub shaft 35. The idling sprocket 25 is freely rotatably supported on a collar or hub 37 of the fixed sprocket 24.

It is to be understood that instead of the described embodiment the invention may be so designed that in each instance at one deflecting roll 11 the fixed sprocket 24 is arranged at one roll end whereas the idling sprocket 25 is arranged at the opposite roll end. In such case then, on each side, as viewed along the drive chain, the fixed sprockets 24 and the idling sprockets 25 are alternatingly arranged on subsequent deflecting rolls.

It will be understood that the above description of the present invention is susceptible to various modifications, changes and adaptations, and the same are intended to be comprehended within the meaning and range of equivalents of the appended claims.

What is claimed is:

1. A plate filter having a length, comprising
   (a) a stand;
   (b) a plurality of filter plates supported on said stand in a parallel orientation and being shiftable parallel to said length;
   (c) means for shifting said filter plates towards one another;
   (d) a first deflecting roll carried by each filter plate on first side thereof; each first deflecting roll having a roll axis; roll axes of consecutive first deflecting rolls, as viewed parallel to said length, lying alternatingly in a first plane and in a second plane spaced from one another;
   (e) a second deflecting roll carried by each filter plate on a second side thereof;
   (f) a filter cloth supported by said first and second deflecting rolls; said filter cloth being trained in succession alternatingly about said first and second deflecting rolls for guiding said filter cloth in a zigzag course between consecutive filter plates;
   (g) a first sprocket affixed to each said first deflecting roll coaxially therewith for rotation with the first deflecting roll as a rigid unit; each said first sprocket having a diameter;
   (h) a second sprocket mounted on each said first deflecting roll coaxially therewith for free idling rotation relative to the first deflecting roll; each said second sprocket having a diameter; the distance between said first and second planes being greater than the diameter of said first and second sprockets;
   (i) a first elongated drive means being trained in a zigzag course in an alternating sequence about first and second sprockets of first deflecting rolls belonging to consecutive filter plates as viewed along said length; said first elongated drive means being in meshing relationship with the first and second sprockets about which said first elongated drive means is trained;
   (j) a second elongated drive means being spaced from said first elongated drive means in a direction perpendicular to said length; said second elongated drive means being trained in a zigzag course in an alternating sequence about second and first sprockets of first deflecting rolls belonging to consecutive filter plates as viewed along said length; said second elongated drive means being in meshing relationship with the first and second sprockets about which said second elongated drive means is trained; the zigzag course of said first elongated drive means being parallel to the zigzag course of said second elongated drive means; the diameter of said first and second sprockets and the distance between said first and second planes being dimensioned for varying the magnitude of a looping angle represented by an arc along which the first and second elongated drive means are in engagement with respective first and second sprockets to compensate for length variations of said first and second elongated drive means upon shifting motion of said filter plates relative to one another; and
   (k) means for driving said first elongated drive means in a first direction and said second elongated drive means in a second, opposite direction for rotating said first deflecting rolls to advance said filter cloth in said zigzag course thereof.

2. A plate filter as defined in claim 1, wherein said first and second sprockets on each said first deflecting roll are arranged side-by-side at one axial end of the respective first deflecting roll; further wherein said first sprockets of the first deflecting rolls whose roll axis lies in the one of said first and second planes is situated between the respective first deflecting roll and the respective second sprocket and said second sprockets of the first deflecting rolls whose roll axis lies in the other of said first and second planes is situated between the respective first deflecting roll and the respective first sprocket.

* * * * *